Jan. 26, 1954

W. O. VEDDER 2,667,233

SHAKER MECHANISM FOR DUST COLLECTOR FILTER BAGS

Filed Dec. 12, 1950

INVENTOR.
WALTER O. VEDDER

BY

HIS ATTORNEY.

Jan. 26, 1954 W. O. VEDDER 2,667,233
SHAKER MECHANISM FOR DUST COLLECTOR FILTER BAGS
Filed Dec. 12, 1950 3 Sheets-Sheet 2

INVENTOR.
WALTER O. VEDDER
BY
HIS ATTORNEY.

Jan. 26, 1954　　　W. O. VEDDER　　　2,667,233
SHAKER MECHANISM FOR DUST COLLECTOR FILTER BAGS
Filed Dec. 12, 1950　　　3 Sheets-Sheet 3
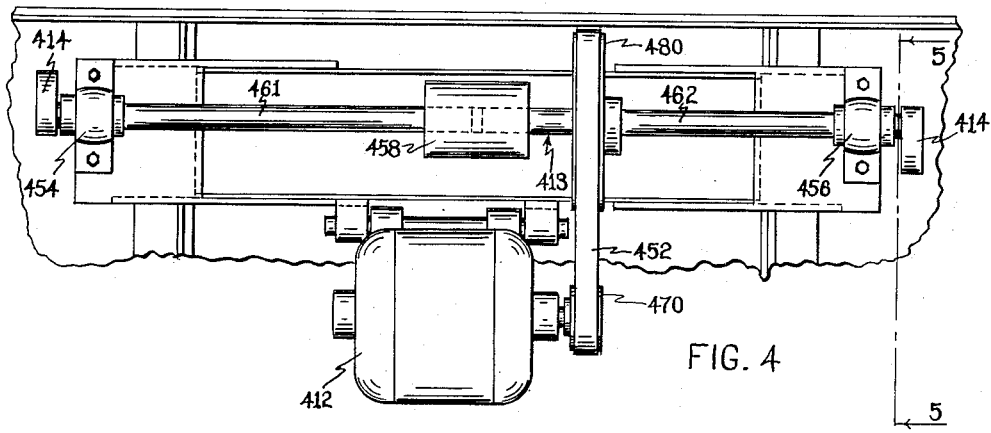
FIG. 4
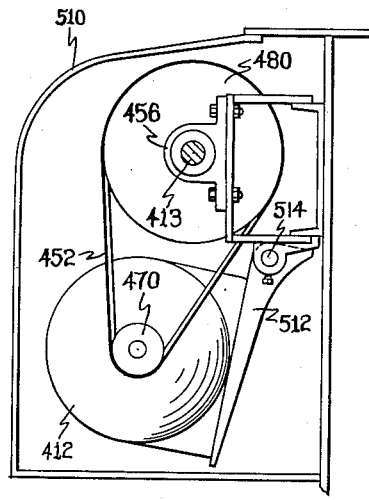
FIG. 5
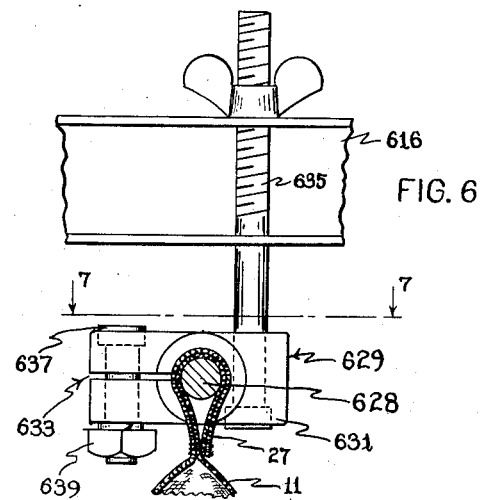
FIG. 6
FIG. 7
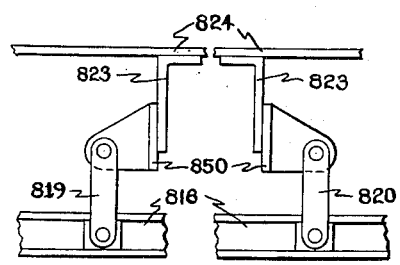
FIG. 8
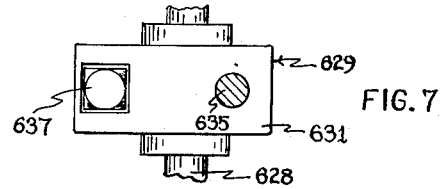
INVENTOR.
WALTER O. VEDDER
BY
HIS ATTORNEY.

Patented Jan. 26, 1954

2,667,233

UNITED STATES PATENT OFFICE 2,667,233

SHAKER MECHANISM FOR DUST COLLECTOR FILTER BAGS

Walter O. Vedder, Hagerstown, Md.

Application December 12, 1950, Serial No. 200,396

2 Claims. (Cl. 183—58)

This invention relates to a shaker mechanism, and more particularly a shaker mechanism for a filter bag type of dust collector apparatus. Such dust collector apparatus has long been used in industry to remove solid particles suspended in the atmosphere, and to thereby protect both workmen and equipment, as well as to reclaim any valuable material in these particles.

The method of operation of such a collecting apparatus is to force the impure air out through a filter bag, usually made of textile fabric or similar material, whereupon the air passes through the pores of said bag while leaving any impurities, which are suspended therein, deposited on the inside wall of the bag. The cleansed air may then be distributed by blowers or other devices. To prevent clogging of the filter pores of the bags, these bags are periodically agitated to loosen the impurities coating the inner walls in such a manner that said impurities are shaken off the walls into some sort of container for convenient disposal.

An object of the present invention is to provide a shaker mechanism which will insure such agitation of the filter bags as to efficiently dislodge the deposited solids on the walls thereof, which shaker mechanism has a reduced number of components subject to wear.

Another object of the invention is to provide a shaker mechanism which will be economical to manufacture and to maintain.

Still another object of the invention is to provide a shaker mechanism which will allow the convenient removal and replacement of the filter bags.

A further object of this invention is to provide a shaker mechanism of such design as to be readily adaptable to any size dust collector apparatus and to be readily adaptable to varying arrangements of rows of filter bags within such a collector apparatus.

Although the above, and other novel features and advantageous characteristics of this filter bag shaker mechanism, when used with dust collector apparatus, will be apparent from the following description, drawings and claims, it is not meant to limit the use of this invention solely to such apparatus. Rather, the use of this invention is extended to all classes of similar apparatus in which filters are shaken so that they can be reused.

The present invention is exemplified in the following drawings of which:

Fig. 4 shows an alternate driving motor installation in side elevational view with the cover removed;

Fig. 5 is a view of Fig. 4 taken along line 5—5, with the cover installed;

Fig. 6 shows a front elevation of an alternate bag suspension rod clamp assembly;

Fig. 7 is a cross sectional view taken along section lines 7—7 of Fig. 6;

Fig. 8 shows the front elevation of an alternate suspension link and suspension beam assembly.

Figures 1, 9:
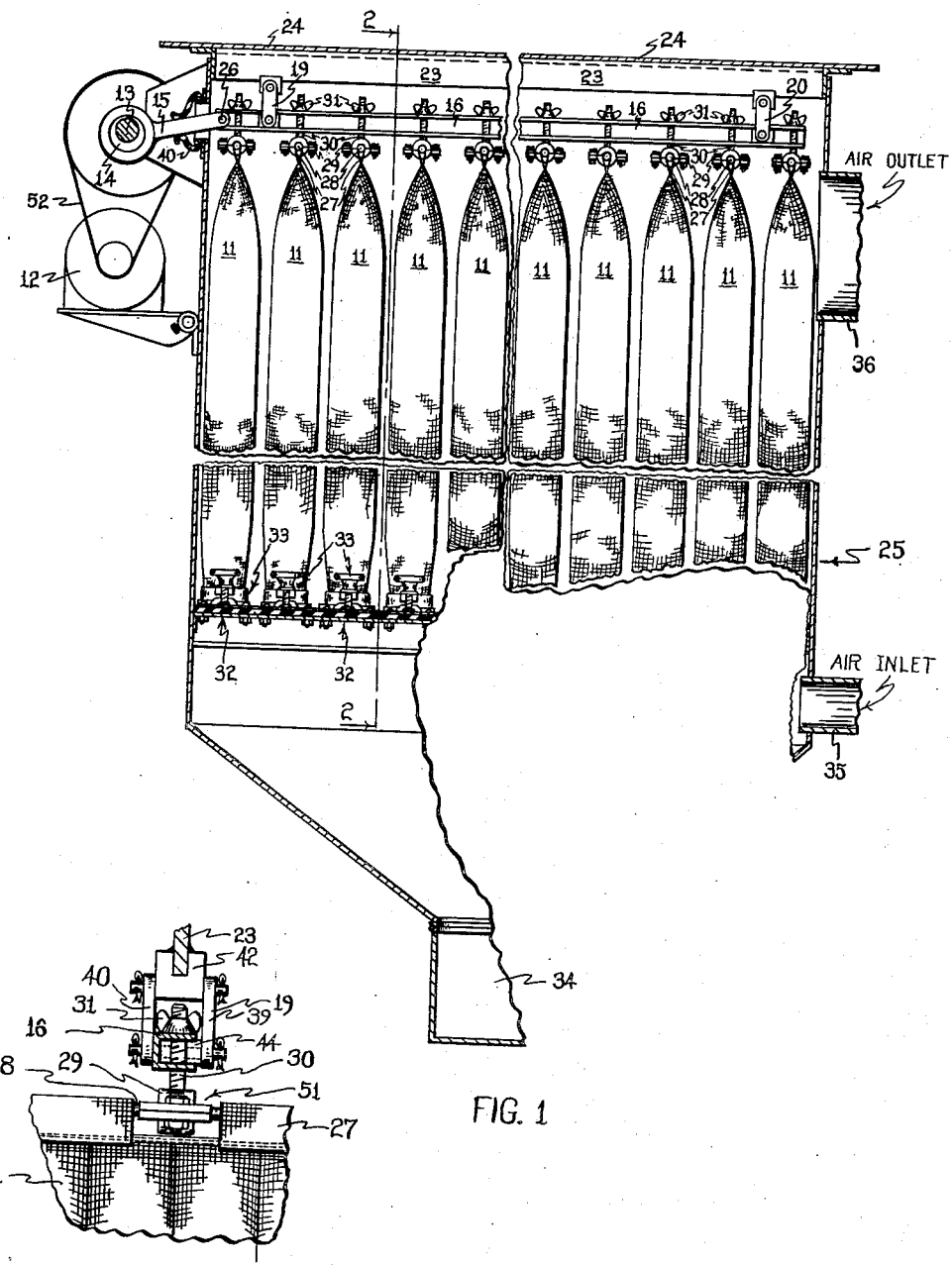
Fig. 1 is a sectional view of a dust collector apparatus, illustrating the use and arrangement of the shaker mechanism of the invention and taken along section line 1—1 of Fig. 2.
Fig. 9 is an enlarged detail view of the bag suspension structure of Fig. 2.

Referring now particularly to Fig. 1, filter bags 11 are shown as elongated textile tubes of generally flattened cross section, with the top end of each bag folded back and secured to itself to form a loop 27, as shown more clearly in Fig. 6. Through said loops 27 are loosely inserted bag suspension rods 28. An opening 51 (see Fig. 9) is provided along said loop 27 through which a clamp 29 can be rigidly fastened to each rod in such a manner that a threaded arm 30, extending from said clamp 29, may be fastened to a support bar 16 by means such as wing nut 31. The bottoms of the filter bags 11 are so constructed as to be held expanded in sealed relation about individual openings in a floor grid plate 32 by various devices such as clamping apparatus 33. The details of this clamping apparatus form no part of the present invention but a suitable arrangement of such an apparatus is described in the copending Vedder application, Serial No. 137,220, filed January 6, 1950, now Patent No. 2,612,236, granted September 30, 1952.

One or more inlets 35 for dust-laden air enter the housing below the floor plate 32 as shown, and an air outlet 36 above the floor is connected to deliver the filtered air to the desired locations.

The support bar 16 is arranged to be swung by suspending it with a pair of suspension links 19 and 20 from suspension beam 23 which is mounted along the top of filter casing 24 in which filter bags 11 are housed. A motor 12 is connected for energization to transmit power through V belt drive 52 to cam shaft 13 and to cam 14 mounted thereon. This power is, in turn, transmitted through the rotating oscillation of cam 14 by means of rocker link 15 which follows cam 14 and is connected by rocker link pivot 26, to support bar 16. This linkage transmits the oscillatory movement of cam 14 to support bar 16 while transforming the rotary oscillation of the cam to a swinging, to and fro movement of said bar 16. Since the tops of filter bags 11 are attached to said bar 16, these tops are also carried through the swinging or arcuate movement. As the upper portions of the bags swing, they are not only displaced laterally from the central position in which they are illustrated in Fig. 1, but they are stretched vertically from this position. Alternate lateral and vertical flexing of this character rapidly and efficiently frees the deposited solids caked on the inside of said filter bags 11 and allows said solids to fall, under the action of gravity, through the open bottoms of bags 11 and through floor grid plate 32, to the disposal hopper 34.

A feature of the present invention is the simplicity of the shaker mechanism. This mechanism has a minimum of moving parts, and as a result, is subjected to very little frictional wear. It is worthy of note that the filter bags in the row illustrated in Fig. 1, are all shaken by means of a single unitary support bar suspended by means of only two links. The number of filter bags which may be thereby agitated is substantially unlimited, since more bags may be accommodated in such a row by suitably adjusting the length of the unitary support bar.

The filtering capacity available is, of course, varied with the number of filter bags included in the row arrangement. However, the filtering capacity may also be conveniently enlarged by the use of a multiplicity of support bars 16, two being shown in Fig. 2. With the very largest sizes of apparatus, it is advisable to use a third suspension link at aproximately the longitudinal center of the support bar. This reduces the rigidity required of the support bar and still retains the advantages of a small number of moving parts.

In Figs. 4 and 5 is shown an alternate driving motor installation. Motor 412 drives pulley 470, and one or more parallel rows of V belts 452 couple this pulley to a pulley 480 on cam shaft 413 mounted in bearings 454 and 456. This shaft 413 is composed of two identical halves 461, 462 joined by ribbed compression coupling 458, and each shaft half carries a cam 414. This driving assembly is suitable for powering the double support bar installation shown in Fig. 2. If desired, cam shaft 413 could be made to mount a multiplicity of cams 414 and drive a corresponding multiplicity of support bars 16. Furthermore, when more than one support bar is used, the driving mechanism can be adjusted to swing the individual support bars in an out-of-phase relationship to reduce driving stresses. This can be carried further as shown in Fig. 4, by equally spacing the phase displacement of the individual cams to more or less balance the driving stresses on the cam shaft. Also illustrated in Fig. 5 is an optional assembly cover 510, as well as an adjustable belt-tension device obtained by hinging motor mount 512 to a fixed portion of the casing, by means of pivot shaft 514 in a manner similar to that shown in Fig. 1.

Figure 2:
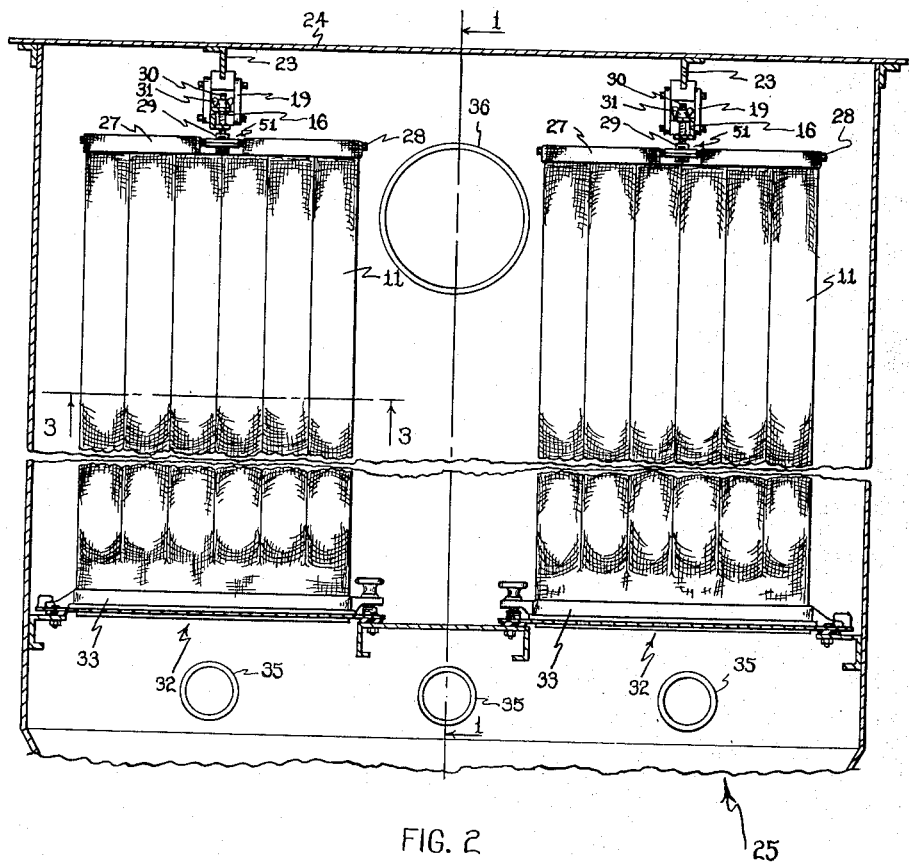
Fig. 2 is a partial cross sectional view taken along section line 2—2 of Fig. 1.

When a plurality of support bars 16 are to be used, the alternate suspension assembly shown in Fig. 8 can advantageously be substituted for the suspension method shown in Figs. 1 and 2. In the suspension assembly illustrated in Fig. 8, a pair of suspension beams 823 are mounted in housing casing 824 at right angles to, rather than parallel with, support bar 16. By installing a number of pairs of simple brackets 850 along the length of suspension beams 823, a corresponding number of support bars 816 can be pivotally mounted on suspension links 819 and 820. Only two suspension beams 823 are thereby required instead of one beam for each support bar, as shown in Figs. 1 and 2. In addition, by suitably selecting the direction that rocker link 15 extends from cam 14, the position of the support bar 16, with its corresponding row of filter bags, may be so varied as to allow considerable latitude in the design of the shape of the dust collector apparatus 25. It is apparent that the shaker mechanism of the invention allows the alternate positioning of motor 12 inside or outside of casing 24 by the selection of suitably sized linkages and auxiliary apparatus, such as air seal 40. For ease in maintenance, however, it is usually desirable to have the motor, and as much of the driving mechanism as practicable, outside of the casing as shown in Figs. 1, 4 and 5.

The method of attaching the filter bags 11 to support bar 16, as illustrated in Figs. 1, 2 and 6 is unusually convenient for changing said bags, necessitating only the removal of wing nut 31 and the withdrawal of the bag with the clamp and suspension rod 28 still attached. These members can be removed from the bag by merely loosening the clamp after the bag is withdrawn. The above construction also allows loop 27 to loosely pivot about rod 28 and reduce the torsional stresses developed in the fabric of this loop during the swinging movement.

In Figs. 6 and 7 is shown an alternate clamp 629, attaching bag suspension rod 628 to support bar 616. Clamp 629 has a one-piece body 631 split as indicated at 633 and secured to support bar by means of a standard type of bolt 635. A locking bolt 637 penetrates the clamp jaws on either side of the split, and a nut 639 on this bolt draws the jaws together about the suspension rod 628. Bolt 635 can be held in place merely by the weight of the bag it holds, or it can be more securely fixed as by a press fit in the clamp body and/or locking nuts below support bar 16 and above the clamp body. Either type of clamp 629 or 29, coacting with opening 51, eliminates the need for any special apparatus to prevent the bags from working off the suspension rods.

The present invention is designed for use with the type of filter bags 11 illustrated in Figs. 1 and 2. This type of bag has the advantage of a relatively large filter surface with a restrained shape. The simple expedient of partially stitching the bags along their length as shown at 310, gives the cross section shown in Fig. 3, prevents billowing and allows the bags to be closely spaced as shown in Fig. 1. However, it is obvious that any other shape filter bag could be used, instead of the type illustrated, by the selection of a suitable bag suspension rod 28, without affecting the efficiency of the shaker mechanism.

Figure 3:
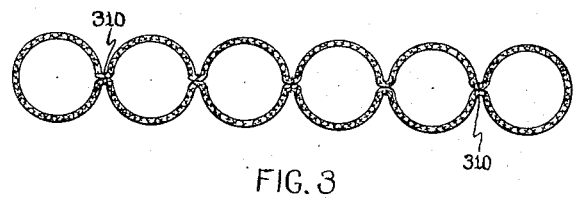
Fig. 3 is an enlarged cross sectional view of an inflated filter bag, and taken along line 3—3 of Fig. 2.

Although many novel and desirable features are disclosed in and obvious from the above description as well as the following claims, it is understood that various omissions, changes and substitutions may be made by those skilled in the art without departing from the spirit of the invention. Thus, the bags of Figs. 1, 2 and 3 are shown as having a generally flattened cross section with an aspect ratio of about 6 to 1 and such bags are suitable for use with filter units having about 8 to 18 bags per row to provide an overall construction having an approximately square outline in plan view. A square housing outline of this type requires a minimum amount of wall materials. However bags with aspect ratios of 5 to 1 or as much as 10 to 1 can also be used in accordance with the present invention with fewer or more bags per row respectively. The use of single rows on each side of the central walk-way and the generally flattened configuration of the bags enables the crowding together of the bags in very closely spaced relationship as shown clearly in Fig. 1. In actual use the individual channels of the bags do not billow out quite so far as indicated in Fig. 3, and are slightly more flattened so that the opposed faces of the bag are even more compact than would be indicated by this figure. It is also pointed out that the individual suspension links 19 or 819 can be of either single or dual construction. So long as both halves of the dual construction are pivoted around the same pins, the advantages of the invention are still obtained. The dual construction, as shown in Fig. 9 for example, is simpler to build in that two spaced link halves 39, 40 can be readily hung from an upper pivot pin in a symmetrical arrangement with respect to an upper bearing block 42 welded in place, and the link halves are also conveniently connected to the support bar 16 as by means of a spaced block 44 and a lower pivot pin.

As many apparently widely different embodiments of this invention may be made without departing from the spirit and scope hereof, it is to be understood that the invention is not limited to the specific embodiments hereof except as defined in the appended claims.

What is claimed is:

1. In a dust collecting apparatus for filtering and collecting dust from air including filter bags and means for shaking the filter bags free of collected dust, the improvement which comprises an overhead fixed support, at least two but not more than three suspension links each having one end pivotally mounted to depend from said overhead support, a swing bar, means pivotally connecting said swing bar to the free ends of said links, mounting means suspended from said swing bar including structure for interchangeably attaching a plurality of filter bag tops, and driving mechanism connected with said swing bar including structure for reciprocating said bar along its longitudinal axis to cause the bar to swing to and fro about said link pivots and transmit an intermittent stretching and snapping action to said bags for freeing collected dust therefrom.

2. A shaker mechanism for laterally oscillating and vertically reciprocating filter bags of a dust filter, said mechanism comprising overhead fixed support means, a plurality of elongated bars, suspension means in the form of a pair of suspension links swingedly suspending each bar from said support, a common driving mechanism connected to longitudinally reciprocate said bars to cause them to swing when longitudinally reciprocated, and corresponding attaching structure connected to each supporting bar for separately and directly attaching to each of said supporting bars the tops of a plurality of closely spaced filter bags for causing said bag tops to swing with each bar, said driving mechanism including means connected to swing the individual support bars in out-of-phase relationship for reducing driving stresses.

WALTER O. VEDDER.

References Cited in the file of this patent
UNITED STATES PATENTS

| Number | Name | Date |
|---|---|---|
| 1,747,131 | Parsons | Feb. 11, 1930 |
| 2,137,254 | Turnbull | Nov. 22, 1938 |
| 2,143,664 | Snyder | Jan. 10, 1939 |
| 2,204,590 | Hamilton | June 18, 1940 |